Dec. 21, 1954    C. M. ZVANUT    2,697,734
THERMOCOUPLE PROTECTING TUBE
Filed Aug. 4, 1951
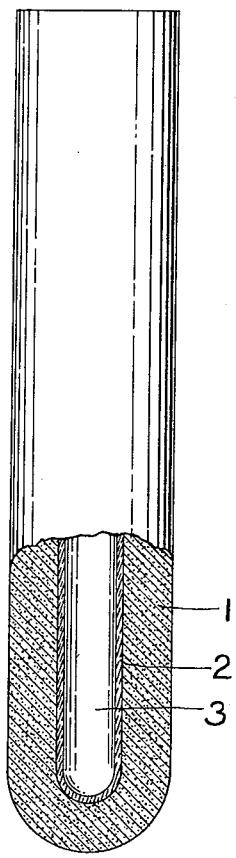
INVENTOR.
Carl M. Zvanut
BY
ATTORNEY 2,697,734

Patented Dec. 21, 1954

2,697,734

THERMOCOUPLE PROTECTING TUBE

Carl M. Zvanut, Alton, Ill., assignor to Olin Mathieson Chemical Corporation, a corporation of Virginia Application August 4, 1951, Serial No. 240,381

5 Claims. (Cl. 136—4)

This invention relates to the measurement of temperature by means of a thermocouple and more particularly to a protective tube for shielding the thermocouple from the deleterious effect of molten metals thereon.

In the melting of metal it is desirable to maintain accurate control of the temperature of the bath and it is common practice to measure such temperatures by means of thermocouples encased in protective tubes. Such tubes are usually formed of steel although a variety of protective tubes of various compositions and of composite construction have been proposed for the purpose. By utilizing such a tube the life of the thermocouple is greatly increased and the thermocouple is not contaminated. For best operation the protecting tube should be unaffected by the molten metal and should rapidly transmit the heat from the molten metal to the thermocouple. It has been customary for the most part to measure the temperature of the metal in the melting furnace by immersing the protective tube containing the thermocouple in the metal at the time a reading was to be taken. With such intermittent operation, steel protecting tubes have had some success. However, such prior protecting tubes are unsatisfactory when it is desired to permanently mount a thermocouple in a melting furnace or a mold wall due to the rapid corrosion and erosion of such prior protection tubes.

It is therefore an object of this invention to provide a longer lasting more efficient protective tube for thermocouples. Another object is to provide a protective tube for a thermocouple which will satisfactorily withstand the erosive action of oxygen-containing copper and various copper base alloys. Still another object is to provide a protective tube of a novel composition for a thermocouple whereby the life of the temperature measuring device is greatly increased. A further object is to provide a simple protective device for thermocouples having a more efficient and longer life than such prior devices. A still further object is to provide a protecting tube for a thermocouple eminently satisfactory for continuous immersion in a molten metal bath, so that the temperature of such metal can be continuously recorded and thereby controlled.

The foregoing objects and advantages are accomplished in accordance with this invention by providing a protecting tube formed of a mixture of zirconium and boron hereinafter referred to as zirconium boride. It has been found when the protecting tube is formed of zirconium boride that such material is highly resistive, for example, to any attack by oxygen or other constituents of copper alloys and is admirably suited for the purpose, and may be used to advantage with aluminum and other metals and alloys.

The protective tube may have practically any desired design and construction. In the drawing a typical embodiment is illustrated in which a protective tube 1 having a closed end is provided with an inner tube or liner 2 of porcelain or similar resistant material with the opening or hollow portion 3 being adapted for housing the thermocouple. Ordinarily it is not necessary to include the liner 2, but where very high temperatures are to be measured such a liner may be utilized to good advantage to prevent attack on the thermocouple by vapors from the zirconium boride tube when thermocouples subject to such attack are utilized.

Such protective tubes may be fabricated in any suitable manner, but powder metallurgy practices in which the boron and zirconium are heated are particularly well adapted for the purpose. It is only necessary that the zirconium boride tube be of sufficient density and have sufficient strength to withstand the mechanical action of the molten metal bath and the corrosive and erosive action of its constituents. For example, the tubes may be formed by compacting zirconium boride in the form of a powder in the desired shape and thereafter heating the compacted mass to a relatively high sintering temperature, i. e. a temperature in the range just below the melting point of the composition, or by hot compressing a mass of the zirconium boride powder in the desired shape, or, for instance, by first compacting a mass of the zirconium boride in the form of a powder in the desired shape, heating the shaped mass to sintering temperature, and thereafter further shaping and compressing the sintered mass by heating to a temperature below the melting point of the composition under pressure. It is sometimes of advantage in such sintering operations to utilize a cementing material which, for instance, may be some compatible metal facilitating the coherence of the particles of zirconium boride or may even be an ordinary glue-like or organic adhesive material. However, it is preferable to use only a minimum amount of such cementing materials, due to the fact that they sometimes by their very nature detract from the life of the tube rather than result in any benefit. In any event, the sintering and shaping operation should be so carried out as to provide sufficient bonding and coherence between the particles of zirconium boride to prevent breakdown by mechanical action of the bath and deleterious chemical attack.

In addition to being resistant to the usual yellow brasses, red brasses, and leaded brasses, resistance of such protective tubes is very high when utilized with oxygen-containing metals or with phosphorous-containing metals such as the phosphorous bronzes and even iron-containing alloys, which are particularly destructive. It has been found that the zirconium boride tubes of this invention are vastly superior to other materials considered for the purpose. For example, although graphite is admirably suited as a thermocouple shield or protective tube it is not well-suited for use with oxygen-containing alloys and a relatively short life thereof results. Steel is entirely unsuited as a tube for continuous immersion due to the chemical attack occasioned by copper alloys. Whereas the zirconium boride tubes of this invention show practically no evidence of attack after a test of three hours of immersion in molten copper-copper oxide or copper alloys such a material as titanium carbide particles bonded with a cementing material such as cobalt showed a very high erosion rate in molten copper-copper oxide, changing in dimension at the rate of about 0.139 inches per hour. Similarly silicon carbide was found to be eroded in molten copper-copper oxide, changing dimension at the rate of 0.0012 inches per hour and sintered tantalum carbide was rapidly dissolved in such a copper bath at a temperature of about 1170° C. Similarly other known tube compositions tend to be attacked by either the oxygen or other constituents of copper-alloy baths, whereas the zirconium boride tube appears to have substantially universal application.

The protecting tubes in accordance with this invention may be formed as a permanent part of the side wall of the melting furnace, casting mold, or other molten metal receptacle in which it is desired to record the temperature of the metal. In some instances where solid metal is apt to come in contact with the protecting tube it may be advisable to provide an overhanging or protective shield of the furnace refractory or other material to prevent mechanical destruction of the protecting tube.

While in the foregoing the best form of the invention has been illustrated and described, it will be apparent to those skilled in the art that changes may be made in the details thereof without departing from the spirit of this invention and the scope thereof as set forth in the appended claims.

Having thus described the invention what is claimed as new and desired to be secured by Letters Patent is:

1. As a protecting device for a thermocouple, a tube formed of substantially boron and zirconium and having a closed end adapted for immersion in molten metal.

2. As a protecting device for a thermocouple, a zirconium boride tube having a closed end adapted for continuous immersion in molten metal and housing a thermocouple.

3. As a protecting device for a thermocouple, a tube substantially of sintered zirconium boride and having a closed end adapted for immersion in molten metal.

4. As a protecting device for a thermocouple, a tube of compressed sintered zirconium boride and having a closed end adapted for immersion in molten metal.

5. As a protecting device for a thermocouple, a closed outer tube composed substantially of boron and zirconium housing said thermocouple, said tube being adapted to shield said thermocouple from contact with molten metal when immersed therein and resistant to the attack of molten copper alloys.

References Cited in the file of this patent

UNITED STATES PATENTS

| Number | Name | Date |
|---|---|---|
| 1,773,826 | Simms | Aug. 26, 1930 |
| 2,094,102 | Fitterer | Sept. 28, 1937 |
| 2,207,558 | Singer | July 9, 1940 |
| 2,372,212 | Lewin | Mar. 27, 1945 |
| 2,571,700 | Ford | Oct. 16, 1951 |

FOREIGN PATENTS

| Number | Country | Date |
|---|---|---|
| 393,403 | Great Britain | June 8, 1933 |

OTHER REFERENCES

Materials and Methods, vol. 31, issue No. 5, page 61, May 1950.

Materials and Methods, No. 137, April 1947, page 143.

Treatise on Powdered Metallurgy, vol. 2, page 93, by Goetzel by Interscience Publishers, 1950.

Comprehensive Treatise on Inorganic and Theoretical Chemistry, vol. 5, page 28.